US009284041B2

(12) United States Patent
Belmonte et al.

(10) Patent No.: US 9,284,041 B2
(45) Date of Patent: Mar. 15, 2016

(54) STATIONARY ACTUATOR DEVICE FOR CONTROLLING THE PITCH OF FAN BLADES OF A TURBOPROP

(75) Inventors: Olivier Belmonte, Perthes en Gatinais (FR); Franck Emmanuel Bosco, Sainte Genevieve des Bois (FR)

(73) Assignee: SNECMA, Paris (FR)

( * ) Notice: Subject to any disclaimer, the term of this patent is extended or adjusted under 35 U.S.C. 154(b) by 1010 days.

(21) Appl. No.: 13/375,024

(22) PCT Filed: Apr. 16, 2010

(86) PCT No.: PCT/FR2010/050737
§ 371 (c)(1), (2), (4) Date: Dec. 21, 2011

(87) PCT Pub. No.: WO2010/136684
PCT Pub. Date: Dec. 2, 2010

(65) Prior Publication Data

US 2012/0099987 A1 Apr. 26, 2012

(30) Foreign Application Priority Data

May 29, 2009 (FR) ..................................... 09 53588

(51) Int. Cl.
*F01D 7/00* (2006.01)
*B64C 11/32* (2006.01)
(Continued)

(52) U.S. Cl.
CPC ................. *B64C 11/32* (2013.01); *B64C 11/48* (2013.01); *F01D 7/00* (2013.01); *B64D 2027/026* (2013.01); *F05D 2260/79* (2013.01)

(58) Field of Classification Search
CPC ...... B64C 11/32; B64C 11/325; B64C 11/36; B64C 11/38; B64C 11/385; B64C 11/42; B64C 11/44; B64C 11/48; B64D 2027/026; F01D 7/00; F05D 2260/70; F05D 2260/74; F05D 2260/76; F05D 2260/79
USPC ............ 415/129; 416/34, 108, 114, 115, 129, 416/153, 159, 164, 166, 167, 168 A, 168 R, 416/205, 198 R
See application file for complete search history.

(56) References Cited

U.S. PATENT DOCUMENTS 384,838 A * 6/1888 George ..................... 416/168 R
933,394 A * 9/1909 Schmit ...................... 416/168 R
(Continued)

FOREIGN PATENT DOCUMENTS

FR 0953591 * 5/2009 ............. B64C 11/30
FR WO20100136686 * 5/2009 ............. B64C 11/30
(Continued)

OTHER PUBLICATIONS

International Search Report Issued Nov. 15, 2010 in PCT/FR10/50737 Filed Apr. 16, 2010.

*Primary Examiner* — Richard Edgar
*Assistant Examiner* — Brian O Peters
(74) *Attorney, Agent, or Firm* — Oblon, McClelland, Maier & Neustadt, L.L.P.

(57) ABSTRACT

A device for controlling pitch of fan blades of a turboprop including at least one set of variable-pitch fan blades constrained to rotate with a rotary ring centered on a longitudinal axis and mechanically connected to a turbine rotor, each blade coupled for pitch adjustment to a synchronization ring. A turntable is mounted via a rotary connection to a rod of an actuator that is secured to a stationary structural element of the turboprop, the turntable being mechanically connected to the synchronization ring by a plurality of connection arms hinge-mounted on the turntable and connected to the synchronization ring such that a longitudinal movement of the turntable under drive from the actuator causes the synchronization ring to turn about the longitudinal axis.

7 Claims, 5 Drawing Sheets

(51) Int. Cl.

| | |
|---|---|
| ***B64C 11/48*** | (2006.01) |
| *B64D 27/02* | (2006.01) |

(56) References Cited

U.S. PATENT DOCUMENTS

| | | | | | |
|---|---|---|---|---|---|
| 1,118,374 | A * | 11/1914 | Silverston | ..................... | 416/129 |
| 3,869,221 | A * | 3/1975 | Wildner | ........................ | 415/130 |
| 4,124,330 | A * | 11/1978 | Barnes | ...................... | 416/157 B |
| 4,657,484 | A * | 4/1987 | Wakeman et al. | ............ | 416/127 |
| 4,738,591 | A * | 4/1988 | Butler | ........................... | 416/129 |
| 4,758,129 | A * | 7/1988 | Strock et al. | .................... | 415/69 |
| 4,810,164 | A * | 3/1989 | Wright | .......................... | 415/129 |
| 4,863,352 | A * | 9/1989 | Hauser et al. | ............. | 416/204 R |
| 4,913,623 | A * | 4/1990 | Schilling et al. | ................ | 416/51 |
| 5,286,166 | A * | 2/1994 | Steward | .......................... | 416/89 |
| 5,364,231 | A * | 11/1994 | Eick et al. | ................. | 416/157 R |
| 6,071,076 | A * | 6/2000 | Ansari et al. | .............. | 416/168 R |
| 2007/0207033 | A1* | 9/2007 | Appa et al. | .................... | 416/104 |
| 2010/0104438 | A1* | 4/2010 | Charier et al. | ................ | 416/128 |

FOREIGN PATENT DOCUMENTS

| | | |
|---|---|---|
| GB | 2 155 110 | 9/1985 |
| GB | 2 182 727 | 5/1987 |
| GB | 2 199 378 | 7/1988 |

* cited by examiner

STATIONARY ACTUATOR DEVICE FOR CONTROLLING THE PITCH OF FAN BLADES OF A TURBOPROP

BACKGROUND OF THE INVENTION

The present invention relates to the general field of turboprops including at least one set of variable-pitch fan blades. The invention relates more particularly to controlling the pitch of fan blades in a two-propeller airplane turboprop.

In known manner, a two-propeller airplane turboprop comprises a turbine having two contrarotating rotors, each driving a set of unducted fan blades. By way of example, reference may be made to document GB 2 129 502 that describes various embodiments of such a turboprop. The invention applies more particularly to turboprops in which the propellers are mounted at the rear.

In this type of turboprop, the pitch of the fan blades in each set (i.e. the angular orientation of each blade) constitutes a parameter that is used for controlling the thrust of the turboprop. For this purpose, a known solution for controlling the pitch of the fan blades in a given set has recourse to actuators that are positioned on the rotary portions of the turboprop.

Such control devices are particularly suited for the set of blades that is situated furthest towards the rear of the turboprop. The stator portion of the turboprop is remote from this set, such that it is difficult to install actuators that are secured to a structural element that is stationary. By way of example, reference may be made to patent document EP 1 921 325 that describes a device in which each blade is coupled for pitch adjustment to an actuator member of an annular actuator carried by the rotary casing of the turboprop.

Nevertheless, controlling the pitch of fan blades by means of actuators carried by the rotary portions of the turboprop presents drawbacks. In particular, feeding hydraulic fluid to actuators that are moving in rotation gives rise to manifest practical problems of implementation. Furthermore, the behavior of hydraulic fluid when subjected to centrifugal force is not well known and of uncertain reliability.

OBJECT AND SUMMARY OF THE INVENTION

A main object of the present invention is thus to mitigate the above-mentioned drawbacks by proposing fan blade pitch control that does not require hydraulic services to be set into rotation.

This object is achieved by a device for controlling the pitch of fan blades of a turboprop having at least one set of variable-pitch fan blades, said set being constrained to rotate with a rotary ring centered on a longitudinal axis and mechanically connected to a rotor of the turbine, each blade of the set being coupled for pitch adjustment to a synchronization ring centered on the longitudinal axis, the device being characterized in that it further comprises a turntable centered on the longitudinal axis and mounted via a rotary connection to a rod of an actuator secured to a stationary structural element of the turboprop, the turntable being mechanically connected to the synchronization ring by means of a plurality of connection arms hinge-mounted to the turntable and connected to the synchronization ring in such a manner that longitudinal movement of the turntable under drive from the actuator causes the synchronization ring to turn about the longitudinal axis.

The control device of the invention presents the advantage that the actuator that is used for moving the turntable is itself mounted on a stationary structural element of the turboprop, such that the hydraulic fluid that feeds it is not subjected to the harmful effects of centrifugal force. The device is also reliable and simple to make, and in particular it is well adapted to controlling the blades of the rear set in a two-propeller airplane turboprop.

In an advantageous arrangement, each connection arm comprises an axial link having one end fastened to the turntable by means of a connection that pivots about a tangential axis, and a radial link having one end fastened to the free end of the axial link by means of a connection that pivots about a tangential axis, the free end of the radial link being connected to the synchronization ring in such a manner that longitudinal movement of the turntable drives movement of the radial link in a direction that is substantially radial. Preferably, the device further includes means for converting the movement of the radial link of each connection arm into turning of the synchronization ring about the longitudinal axis.

To this end, the free end of the radial link of each connection arm may be mounted by means of a wormscrew-type connection in a blade root support that is mounted to swivel on the rotary ring and that is connected to the synchronization ring via a drive link. Under such circumstances, the free end of the radial link of each connection arm advantageously has a substantially cylindrical outside surface that is provided with projecting balls co-operating with helical fluting formed in the blade root support.

Alternatively, the device may include a tangential link having one end fastened on the free end of the radial link of a connection arm by means of a connection that pivots about a longitudinal axis, the free end of the tangential link being fastened to the synchronization ring, the synchronization ring being connected via drive links to blade root supports that are mounted to swivel on the rotary ring.

The device may also comprise a tangential link having one end fastened to the free end of the radial link of a connection arm by means of a connection that pivots about a longitudinal axis, the free end of the tangential link being fastened on a blade root support that is swivel-mounted on the rotary ring and that is connected to the synchronization ring via a drive link.

The turntable may be mounted on the rod of the actuator by means of a rolling bearing of the ball thrust bearing type. The connection arms may be regularly distributed around the longitudinal axis. Finally, the set of fan blades may comprise N blades and the turntable is mechanically connected to the synchronization ring by means of N/2 connection arms.

The invention also provides a two-propeller turboprop comprising a turbine having two contrarotating rotors and two sets of variable-pitch fan blades constrained to rotate with two rotary rings that are connected to respective ones of the rotors, the pitch of the blades of at least one of the sets being controlled by a device as defined above.

BRIEF DESCRIPTION OF THE DRAWINGS

Other characteristics and advantages of the present invention appear from the following description given with reference to the accompanying drawings that show embodiments having no limiting character. In the figures.

DETAILED DESCRIPTION OF EMBODIMENTS

Figure 1:
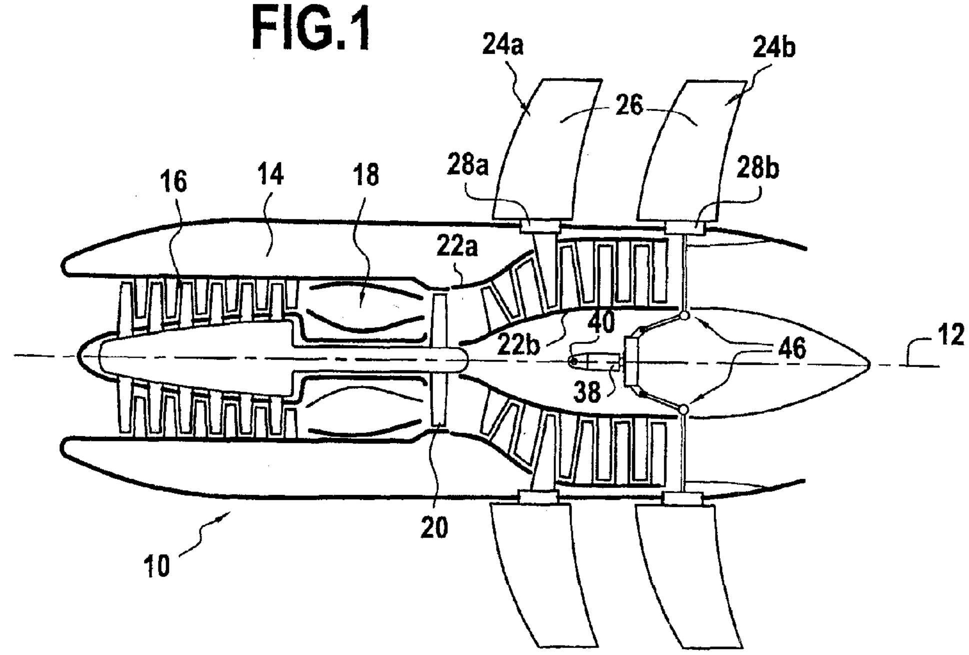
FIG. 1 is a diagrammatic longitudinal section view of a two-propeller turboprop fitted with a propeller pitch control device in an embodiment of the invention.

FIG. 1 is a highly diagrammatic view showing an embodiment of an airplane turboprop of the two-propeller type.

Such a turboprop is known and is therefore not described in detail. The turboprop 10 comprises in particular a longitudinal axis 12 and an annular nacelle 14 arranged coaxially around the longitudinal axis. The turboprop 10 also comprises, from upstream to downstream: a compressor 16; a combustion chamber 18; and a turbine 20 having two contrarotating rotors 22*a*, 22*b*, these various elements likewise being arranged coaxially around the longitudinal axis 12 of the turboprop.

The turboprop 10 also includes variable-pitch fan blades 26 in an upstream (or front) set 24*a* and in a downstream (or rear) set 24*b*. More precisely, the fan blades 26 in each set 24*a* and 24*b* are mounted on respective rotary rings 28*a* and 28*b*, each forming an annular platform centered on the longitudinal axis 12 of the turboprop.

The fan blades 26 in each set are also regularly spaced apart circumferentially and they extend radially from the surface of the corresponding rotary ring 28*a*, 28*b*. Each rotor 22*a*, 22*b* of the turbine 20 carries and drives in rotation a respective one of the rotary rings 28*a*, 28*b* having the variable-pitch fan blades of a respective one of the sets 24*a*, 24*b* mounted thereon.

The turboprop also includes a device for controlling the pitch of the fan blades in each set 24*a*, 24*b*. The control device of the invention applies more particularly to the fan blades of the downstream set 24*b*, but it is equally applicable to the fan blades of the upstream set 24*a*.

Figure 2:
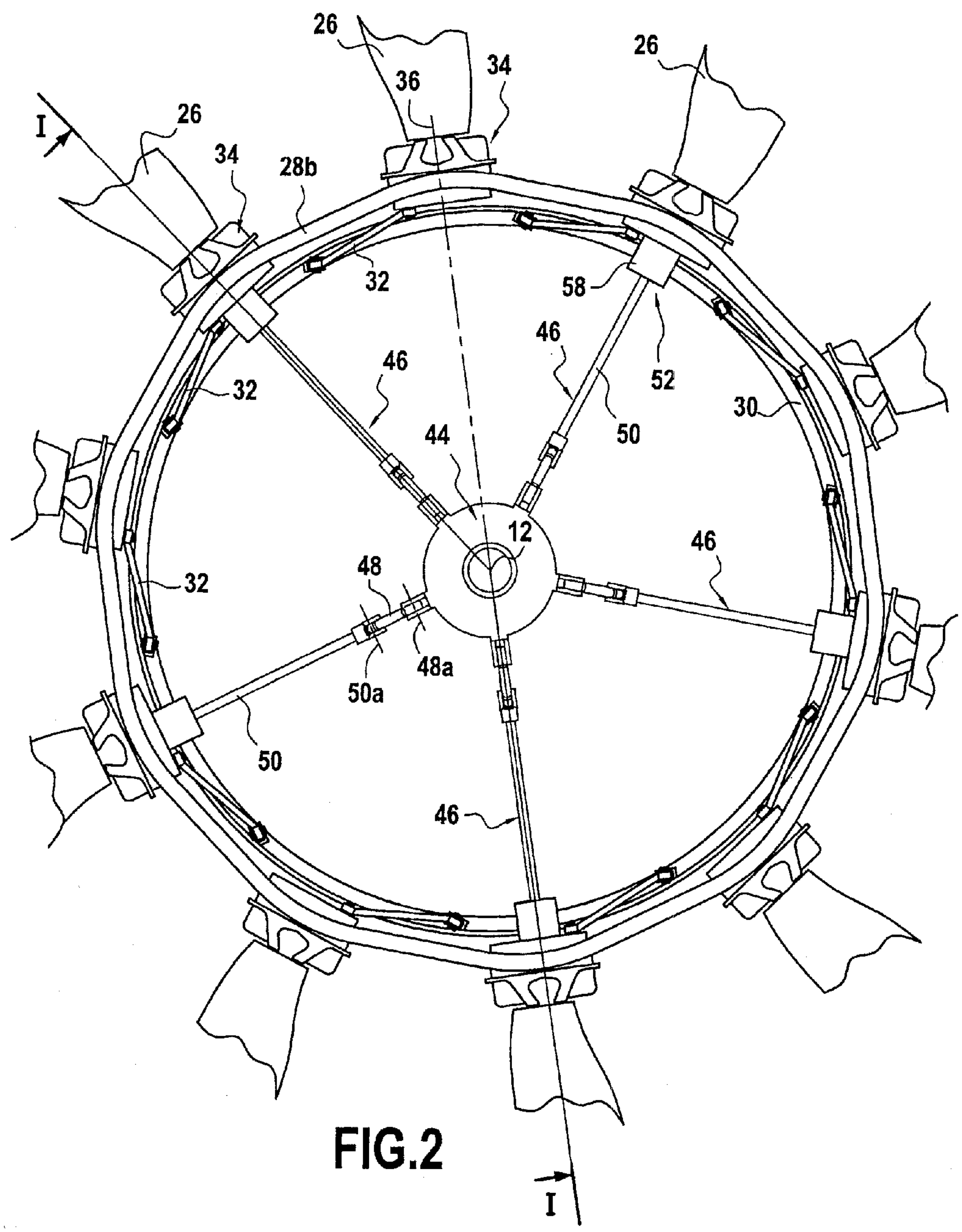
FIG. 2 is a face view of the FIG. 1 control device.

As shown in FIG. 2, the control device of the invention comprises in particular a synchronization ring 30 that is centered on the longitudinal axis 12 of the turboprop and that is arranged coaxially inside the rotary ring 28*b*, which rotary ring is polygonal in shape.

The synchronization ring 30 is connected to blade root supports 34 that are pivotally mounted on the rotary ring 28*b*, the connections being via drive links 32 that are hinged at both ends. In known manner, each support 34 receives the root of a blade 26, e.g. by means of a dovetail-shaped attachment, and it is mounted to swivel about a radial axis 36 on the rotary ring, e.g. by means of a ball bearing.

As a result, turning the synchronization ring 30 about the longitudinal axis 12 of the turboprop (in one direction or the other) causes each blade root support 34 to swivel about its respective radial axis 36 (acting via the drive links 32), thereby having the effect of changing the pitch of the blades 26 mounted on said support.

The control device of the invention also includes an actuator 38 (of hydraulic, pneumatic, or electrical type) that is centered on the longitudinal axis 12 and fastened on a stationary structural element 40 of the turboprop (e.g. a mount connected to the stationary casing that serves to pass services into an isolated zone of the rotating elements). The actuator is actuated on the order of the full authority digital engine controller (FADEC) of the turboprop.

A circular turntable 44 is mounted at its center on the rod 42 of the actuator 38 via a rotary connection (not shown in the figures). By way of example, this rotary connection is a known rolling bearing of the ball thrust bearing type. It enables the turntable 44 to turn about the longitudinal axis 12 while the rod 42 of the actuator remains stationary in rotation.

A plurality of connection arms 46 are hinge-mounted to the turntable 44. For a set that has N fan blades (e.g. N=10), it is possible to use N/2 connection arms 46 that are regularly distributed around the longitudinal axis 12.

Figures 3A, 3B:
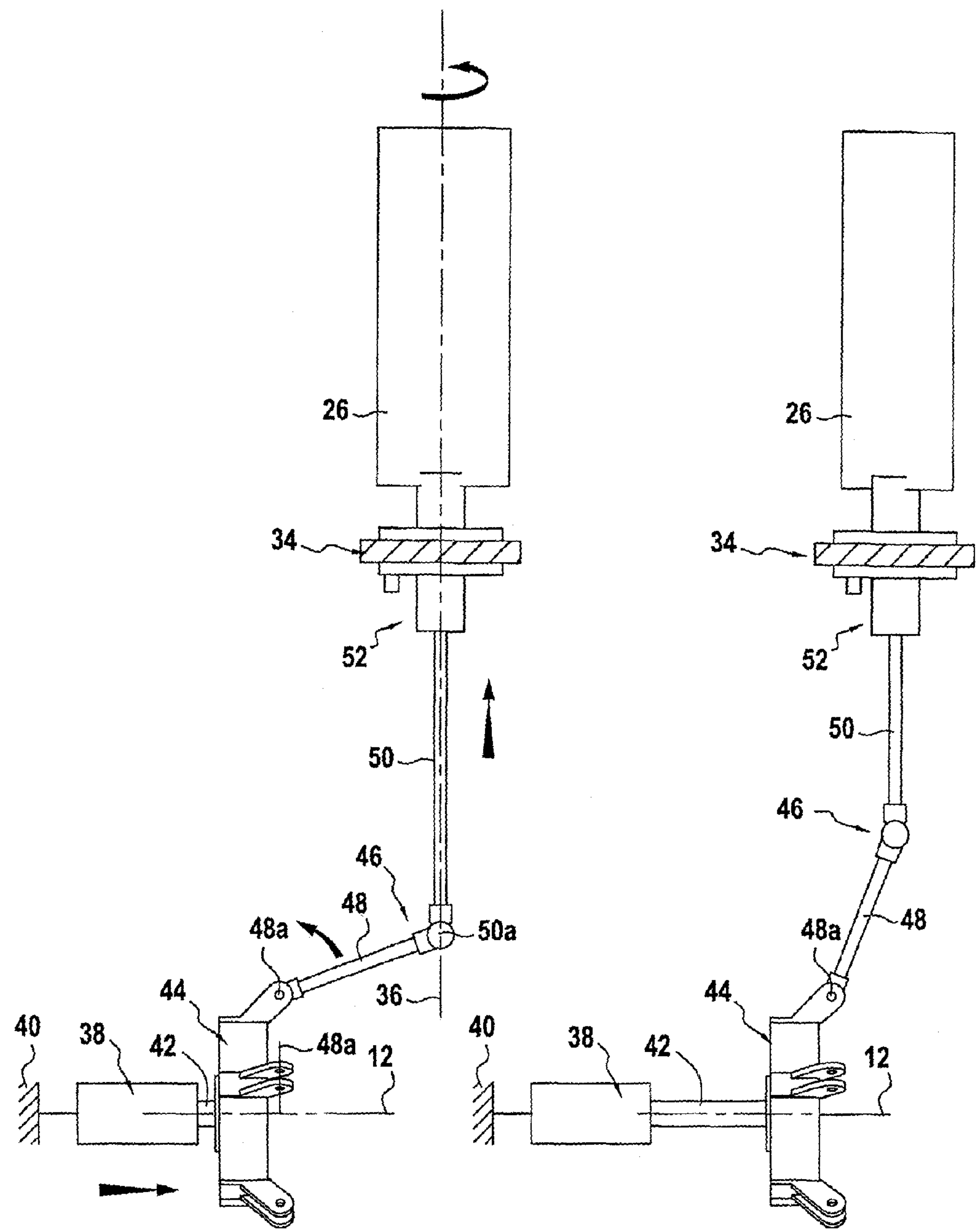
FIGS. 3A and 3B are fragmentary side views of the control device of FIGS. 1 and 2 shown in two different positions.

As shown more precisely in FIGS. 3A and 3B, each connection arm 46 comprises a so-called “axial” link 48 having one end fastened to the turntable 44 via a connection that pivots about a tangential axis 48*a*, and a “radial” link 50 having one end fastened to the free end of the axial link 48 by means of a connection that pivots about a tangential axis 50*a*. The free end of the radial link 50 is connected to the synchronization ring 30 by means of mechanisms that are described below.

Since the radial link 50 is stationary in a longitudinal direction (since it is connected to the synchronization ring), and given the pivoting connections between the links 48, 50, and the turntable, it will readily be understood that a longitudinal movement of the turntable 44 under drive from the actuator 38 will cause the radial link to move in a direction that is substantially radial. This linkage is also shown in FIGS. 3A and 3B.

The control device of the invention also includes conversion means for converting this movement of the radial link 50 in each connection arm 46 into turning of the synchronization ring 30 about the longitudinal axis 12.

In the embodiment of the invention shown in FIGS. 2, 3A, 3B, and 4, these means are implemented by the free end of the radial link 50 of each connection arm 46 being mounted by means of a wormscrew-type connection 52 in a blade root support 34.

Figure 4:
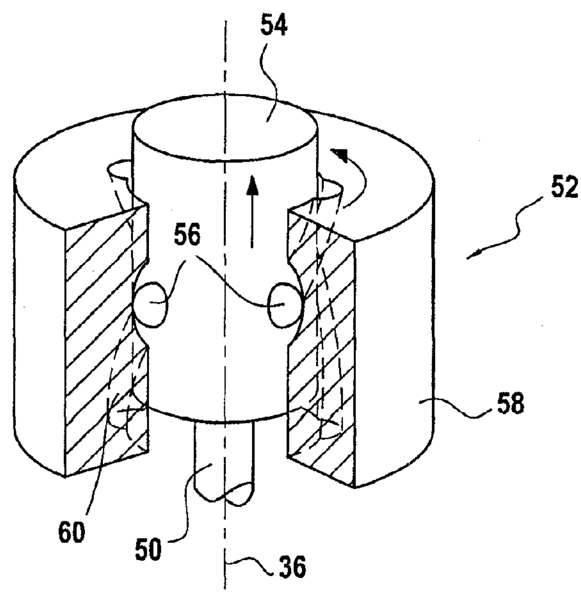
FIG. 4 is a cutaway view showing an embodiment detail of the control device of FIGS. 1 and 2.

More precisely, the free end of the radial link 50 of each connection arm 46 has a substantially cylindrical endpiece 54 having an outside surface that is provided with projecting balls 56 (FIG. 4). The blade root support 34 has a substantially cylindrical portion 58 in which the endpiece 54 at the free end of the radial link is mounted, which portion presents helical fluting 60 with which the balls 56 co-operate.

As a result, radial movement of the endpiece 54 acts via the balls 56 moving in the helical fluting 60 to swivel the portion 58 of the blade root support 34 about its radial axis 36, and consequently change the pitch of the blade 26 mounted on the support. Furthermore, since the support 34 is connected to the synchronization ring by means of a drive link 32, swiveling of this support causes the synchronization ring to turn about the longitudinal axis 12.

Naturally, other embodiments of a wormscrew-type connection can be envisaged. Nevertheless, the embodiment described here presents the advantage of minimizing friction between the endpiece 54 of the radial link and the portion 58 of the blade root support.

Figure 5:
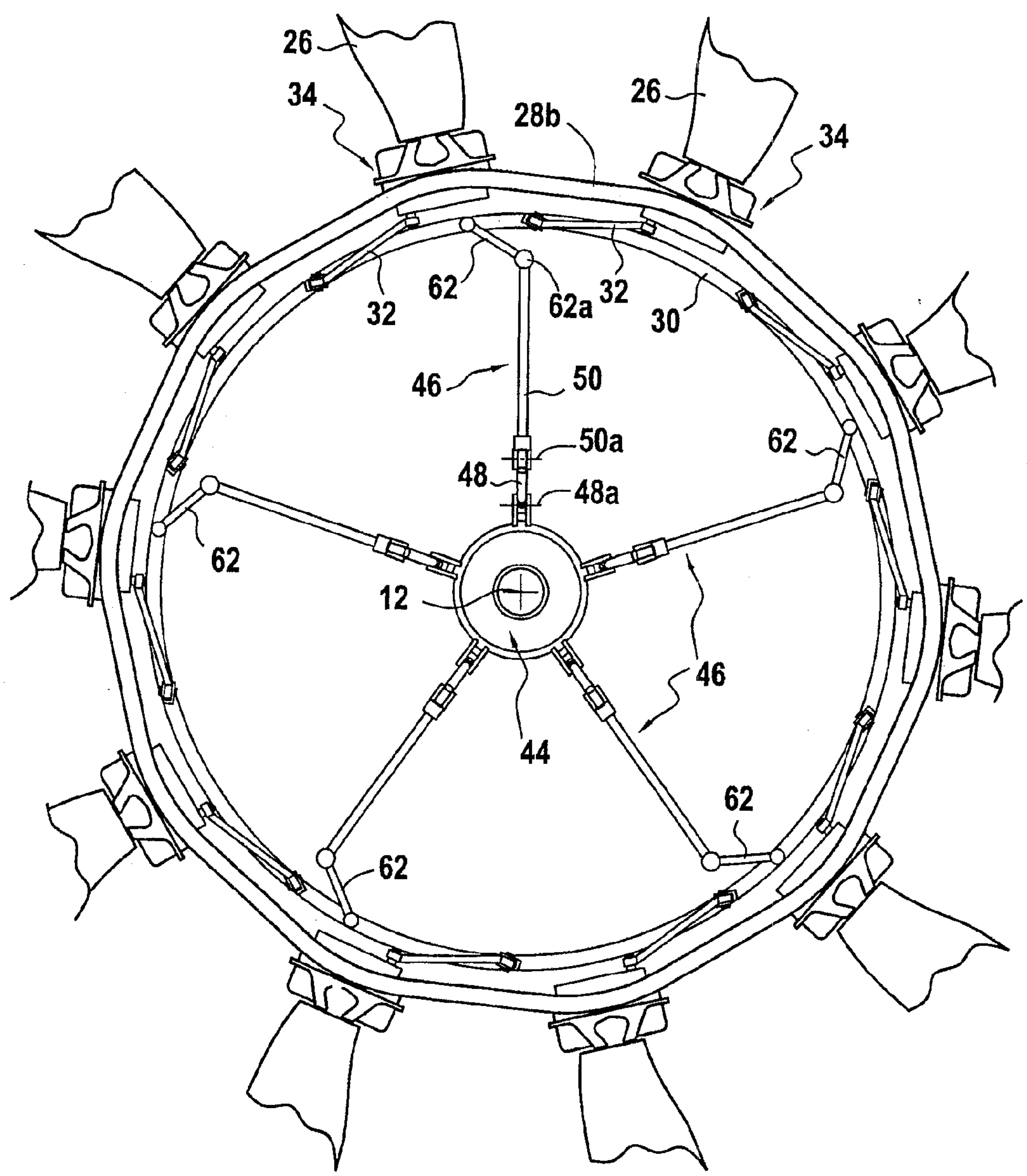
FIGS. 5 and 6 are face views of control devices in two other embodiments of the invention.

In a second embodiment of the invention as shown in FIG. 5, the conversion means for converting the movement of the radial link 50 of each connection arm 46 into turning of the synchronization ring 30 comprise at least one tangential link 62 having one end fastened to the free end of the radial link 50 of a connection arm via a connection that pivots about a longitudinal axis 62*a*, the free end of this tangential link is pivotally mounted on the synchronization ring.

As a result, a radial movement of the radial link 50 of the connection arm 46 causes the synchronization ring 30 to turn about the longitudinal axis 12 by means of the tangential link 62. Since the synchronization ring is connected to the blade root support 34 (by means of the drive links 32), turning of the ring changes the pitch of the blades 26 mounted on the supports.

Figure 6:
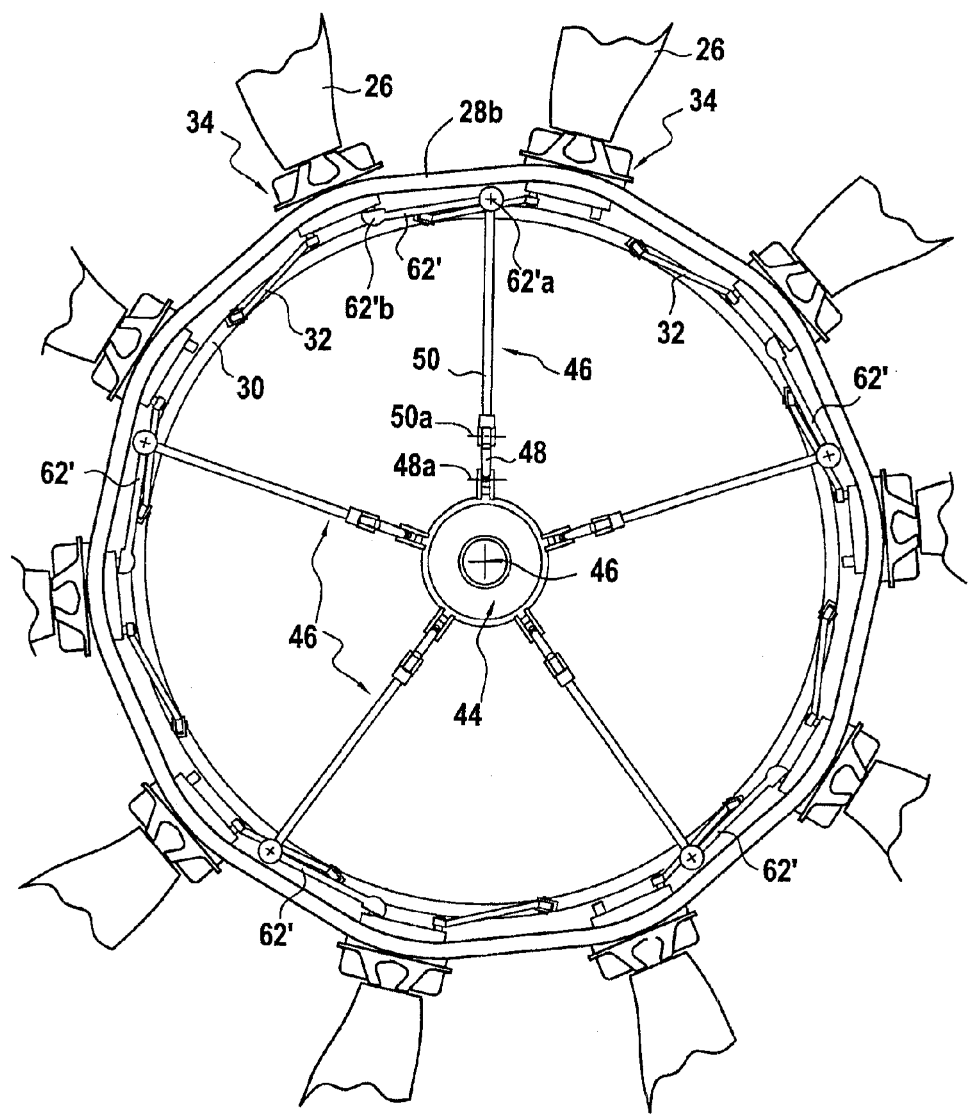

In a third embodiment of the invention as shown in FIG. 6, the conversion means likewise comprise a tangential link 62' having one end fastened to the free end of the radial link 50 of a connection arm 46 by means of a connection that pivots about a longitudinal axis 62'*a*, the free end of this tangential link nevertheless being fastened to a blade root support 34 by means of a ball-joint type connection 62'*b*.

Thus, a radial movement of the radial link 50 of the connection arm 46 causes the blade root support 34 to swivel about its radial axis 36, and consequently changes the pitch of the blade 26 mounted on said support. Furthermore, since the support 34 is connected to the synchronization ring by means of a drive link 32, swiveling of the support causes the synchronization ring to turn about the longitudinal axis 12.

It should be observed that these last two embodiments may be combined. The tangential link(s) of one or more connection arms may be connected directly to the synchronization ring (as in the second embodiment of FIG. 5), while the tangential link(s) of one or more other connection arms may be fastened to one or more blade root supports (as in the third embodiment of FIG. 6).

Furthermore, FIGS. 2, 5, and 6 show an example of a turboprop configuration in which the set of blades having the control device of the invention associated therewith has ten fan blades 26. In such a configuration, five connection arms 46 that are regularly spaced apart around the longitudinal axis 12 of the turboprop may serve to ensure that the synchronization ring 30 turns (which ring is then in the form of a decagon).

Finally, the invention is described above with reference to a turboprop having a contrarotating turbine that is connected directly to the propellers. Naturally, the invention also applies to two-propeller turboprops in which the propellers are driven via planetary gearing.

The invention claimed is:

1. A device for controlling pitch of fan blades of a turboprop including at least one set of variable-pitch fan blades, the set being constrained to rotate with a rotary ring centered on a longitudinal axis and mechanically connected to a rotor of a turbine, each blade of the set being coupled for pitch adjustment to a synchronization ring centered on the longitudinal axis, the device comprising:

- an actuator centered on the longitudinal axis and secured to a stationary structural element of the turboprop, the actuator including a rod movable along the longitudinal axis;
- a turntable which is mounted at a center thereof on the rod of the actuator via a rotary connection such that the turntable is rotatable about the longitudinal axis while the rod of the actuator remains stationary in rotation;
- a plurality of connection arms which mechanically connect the turntable to the synchronization ring, each of the connection arms includes an axial link and a radial link, a first end of the axial link is fastened to the turntable via a first connection which pivots about a first tangential axis, a second end of the axial link is fastened to a first end of the radial link via a second connection which pivots about a second tangential axis, and a second end of the radial link is connected to the synchronization ring, the radial link is stationary in a longitudinal direction;
- means for converting the movement of the radial link of each connection arm into turning of the synchronization ring about the longitudinal axis; and
- a tangential link having a first end fastened to the second end of the radial link of a connection arm by a connection that pivots about a longitudinal axis, a second end of the tangential link being fastened on a blade root support that is swivel-mounted on the rotary ring and that is connected to the synchronization ring via a drive link,
- wherein longitudinal movement of the turntable under drive from the actuator causes the radial link to move in a direction that is substantially radial so as to cause the synchronization ring to turn about the longitudinal axis.

2. A device according to claim 1, wherein the turntable is mounted on the rod of the actuator by a rolling bearing of ball thrust bearing type.

3. A device according to claim 1, wherein the connection arms are regularly distributed around the longitudinal axis.

4. A device according to claim 1, wherein the set of fan blades comprises N blades and the turntable is mechanically connected to the synchronization ring by N/2 connection arms, and N is an even number.

5. A two-propeller turboprop comprising:

- a turbine including two contrarotating rotors and two sets of variable-pitch fan blades constrained to rotate with two rotary rings that are connected to respective ones of the rotors, the pitch of the blades of at least one of the sets being controlled by a device according to claim 1.

6. A device according to claim 1, wherein the actuator is a hydraulic, electric, or pneumatic actuator which is controlled by a digital engine controller.

7. A device according to claim 1, wherein the actuator and the turntable are disposed downstream of a combustion chamber of the turboprop.

* * * * *